April 14, 1931.

W. T. FRAZIER

WHEEL ALIGNING TOOL

Re. 18,047

Original Filed Nov. 30, 1925 2 Sheets-Sheet 1

W. T. Frazier

INVENTOR

BY Victor J. Evans

ATTORNEY

April 14, 1931.

W. T. FRAZIER

WHEEL ALIGNING TOOL

Original Filed Nov. 30, 1925

Re. 18,047

2 Sheets-Sheet 2

W. T. Frazier
INVENTOR

BY Victor J. Evans
ATTORNEY

Reissued Apr. 14, 1931

Re. 18,047

UNITED STATES PATENT OFFICE

WILLIAM T. FRAZIER, OF LOUISA, VIRGINIA, ASSIGNOR, BY MESNE ASSIGNMENTS, TO A. E. FARAGEN, INC., OF SEATTLE, WASHINGTON

WHEEL-ALIGNING TOOL

Original No. 1,665,161, dated April 3, 1928, Serial No. 72,329, filed November 30, 1925. Application for reissue filed November 7, 1928. Serial No. 317,717.

This invention relates to a device for facilitating the aligning of wheels of motor vehicles and the like, the general object of the invention being to provide means, movable with the wheels, to indicate when the same are out of alignment, with indicator means for indicating the amount of movement of such means.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
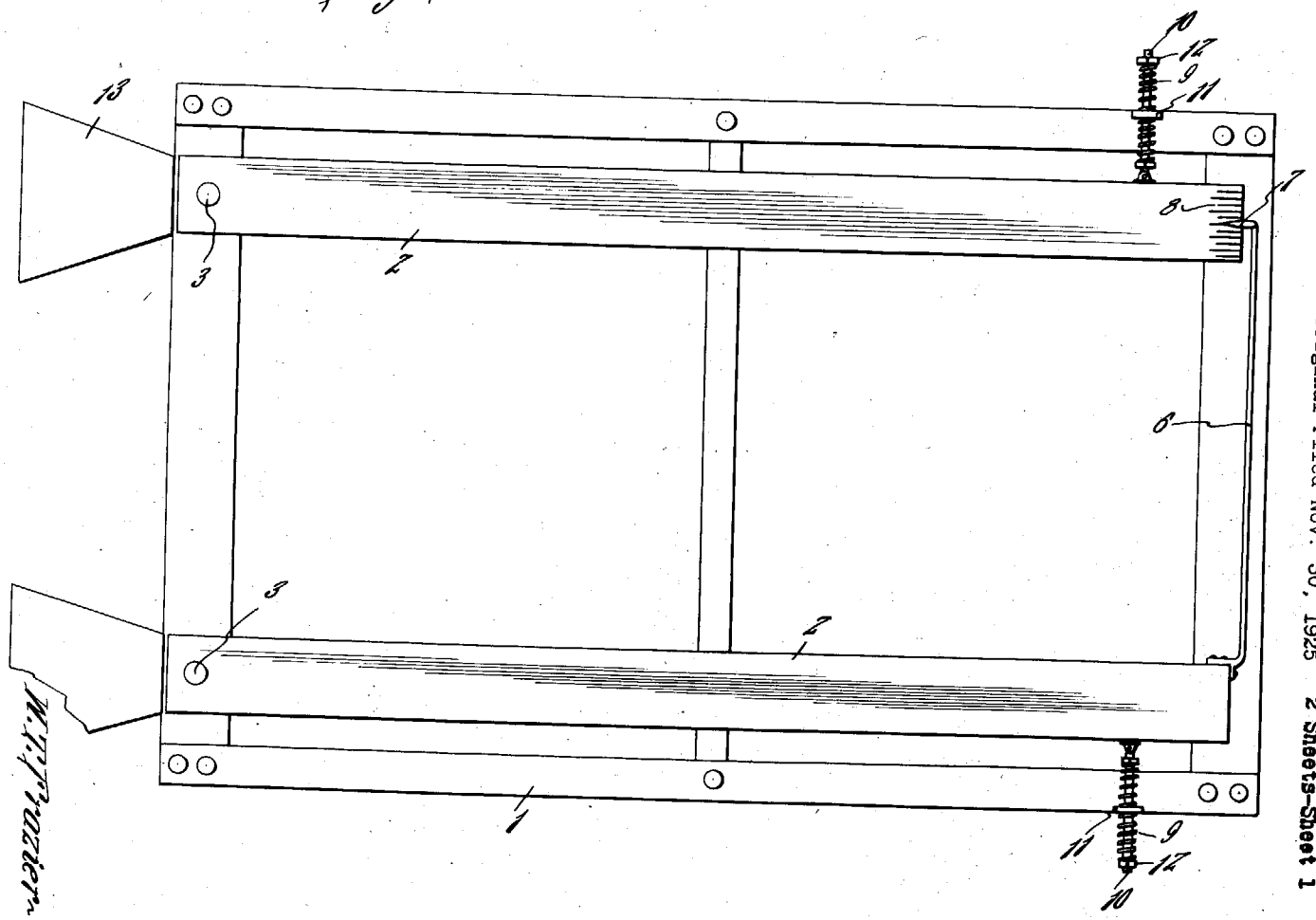
Figure 1 is a plan view of the improved device.
Figures 2, 3, 4:
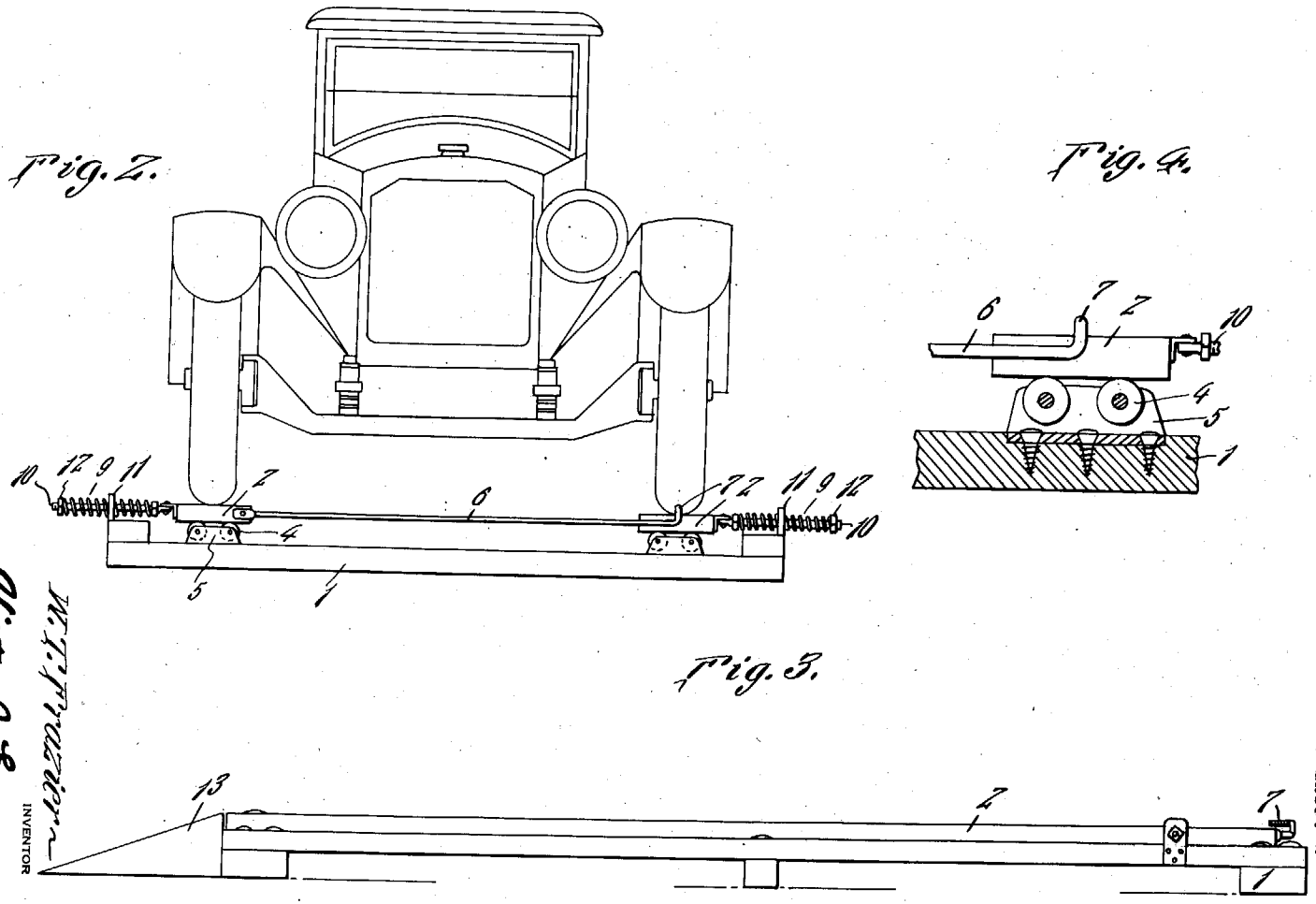
Figure 2 is a front view showing the same in use.
Figure 3 is a side view.
Figure 4 is a detail sectional view.

In these views, 1 indicates a frame which is adapted to be placed on the ground or otherwise supported where an automobile or other vehicle can be driven over the same. A pair of track members 2 is carried by the frame, each member having one end pivotally connected with an end piece of the frame, as shown at 3. The track members extend parallel with the side pieces of the frame and their central parts rest upon the rollers 4 which are carried by the brackets 5 secured to portions of the frame. The other ends of the track members are free and a rod 6 is fastened to the free end of one member and has a finger 7 on its other end which cooperates with the scale 8 on the free end of the other track member so that the relative movements of the track members can be determined.

Each track member is held in a neutral position by means of a pair of springs 9 placed on a rod 10 fastened to the member, adjacent its free end and passing through a projection 11 on the frame, the projection separating the springs, nuts 12 being provided for enabling the tension of the springs to be adjusted. Inclined runways 13 are arranged at the pivoted ends of the track members for enabling a vehicle to be run upon said members.

From the foregoing, it will be seen that when a vehicle is driven upon the device, the front wheels engaging the track members will move such members, if the wheels are out of alignment, as the frictional engagement of the wheels with the members will cause the members to move upon the pivots and upon the rollers. This finger and scale will indicate the amount of such movement so that one can tell just how much the wheels are out of alignment. When the vehicle is removed from the device, the springs 9 will move the track members back to their neutral position.

It would be desirable that the wheels should travel over these track members to the extent of running the entire circumference or tread of the tire thereover, since this would to the greatest extent eliminate factors tending to disturb accurate reading, most noticeable when the automobile is first driven or pulled upon the track members, and due to change in the level of the vehicle, to wracking of its frame if the two wheels do not strike the runways 13 at the same instant, to flexure of the springs, to local variations in the tread surface, to unequal inflation of the tires, and the like. However, such a length of board would roughly approximate the wheel base of the average automobile, and it has been found that the disturbing factors will be neutralized or their effect overcome in a lesser distance. While, therefore, the track members 2 should be of considerable length in the direction of travel of the wheels, the sufficiency of that length may be gauged by the elimination of errors due to disturbing factors such as noted above. However, any length in excess of such a minimum furthers the magnification of the relative displacement of the track members, and makes easier the reading as indicated by the finger 7 and scale 8.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An apparatus of the class described, comprising a frame, a pair of track members each having one end pivoted thereto and the other end free so that said members will move with the wheels of a vehicle engaging the members, if said wheels are out of alignment, one track member having a scale on its free end, means for normally holding the track members in parallel relation and an indicator connected with the other member and cooperating with said scale for indicating the amount of movement of the members.

2. An apparatus of the class described, comprising a frame, a pair of track members carried thereby and each having one end pivoted thereto, anti-friction means for movably supporting the track members, one member having a scale thereon, spring means for normally holding the track members in parallel relation and an indicator connected with the other member and cooperating with said scale for indicating the amount of movement of the members.

3. A wheel alignment indicator comprising an elongated track member pivotally supported adjacent one end to move horizontally under the side thrust of a pair of relatively misaligned wheels one of which is rolling therealong, and an antifriction support for the free end of the member, there being provision at said free end for indicating relative movement thereof.

4. A wheel alignment indicator comprising a track member supported to be run upon by one wheel of a pair to be tested, and of considerable length in the direction of travel of the wheel, one end of said member being free to be displaced laterally under side thrust of a misaligned wheel, and its opposite end being restrained, whereby the side thrust of one of a pair of misaligned wheels, running thereover, will cause lateral movement of the first end relative to the restrained end, and means operatively associated with said track member for indicating such relative movement.

5. A wheel alignment indicator comprising a track member supported to be run upon by one wheel of a pair to be tested, and of considerable length in the direction of travel of the wheel, means supporting said track member to permit lateral displacement of an end thereof relative to the support, there being cooperating indices, one associated with the track member and the other with the support, and displaceable relative to each other upon lateral movement of said end of the track member, thereby to indicate such movement.

6. A wheel alignment indicator comprising, in combination, two track members spaced to be run upon by the two wheels of a pair to be tested for relative misalignment, means supporting said track members to permit lateral displacement of an end of each relative to the corresponding end of the other, and means associated with said track members for indicating such relative displacement.

7. A wheel alignment indicator comprising, in combination, two track members spaced to be run upon by the two wheels of a pair to be tested for relative misalignment, each track member being of considerable length in the direction of travel of the wheels, one end of each track member being free to be displaced laterally under side thrust of a misaligned pair of wheels, whereby the side thrust of such misaligned wheels, running thereover, will cause relative lateral movement of the free ends of said track members, and means operatively associated with said track members for indicating such relative movement.

8. A wheel alignment indicator comprising, in combination, two track members spaced to be run upon by the two wheels of a pair to be tested for relative misalignment, each track member being of considerable length in the direction of travel of the wheels, one end of each track member being free to be displaced laterally under side thrust of a misaligned pair of wheels, and said track members, distant from their free ends, being restrained, whereby the side thrust of such misaligned wheels, running thereover, will cause relative lateral movement of the free ends of said track members, and means operatively associated with said track members for indicating such relative movement.

9. A wheel alignment indicator comprising, in combination, a track member supported to be run upon by one wheel of a pair to be tested, and of considerable length in the direction of travel of the wheel, means supporting said track member to permit lateral displacement of an end thereof relative to its support, and means associated with said track member for indicating such relative displacement.

10. A vehicle wheel alignment indicator including a member disposed to be run upon along a considerable linear distance by one wheel of a pair being tested, a pivotal support for said member permitting its lateral deflection from the direction of relative travel of such wheel, and means associated with said member for indicating any lateral deflection from its initial position.

11. A vehicle wheel alignment indicator including a pair of members disposed to be run upon along a considerable linear distance by the respective wheels of a pair being tested, means whereby said members are normally maintained substantially parallel to each other, a support for said members permitting relative pivotal deflection thereof laterally of the direction of travel of the wheels, and means associated with said members for indicating such relative deflection.

In testimony whereof I affix my signature this 25th day of August, 1928.

W. T. FRAZIER.

CERTIFICATE OF CORRECTION.

Reissue Patent No. 18,047. Granted April 14, 1931, to

WILLIAM T. FRAZIER.

It is hereby certified that the name of the assignee in the above numbered patent was erroneously written and printed as "A. E. Faragen, Inc.," whereas said name should have been written and printed as A. E. Feragen, Inc., as shown by the records of assignments in this office; and that the said Letters Patent should be read with this correction therein that the same may conform to the record of the case in the Patent Office.

Signed and sealed this 7th day of July, A. D. 1931.

M. J. Moore,
Acting Commissioner of Patents.

(Seal)

other, a support for said members permitting relative pivotal deflection thereof laterally of the direction of travel of the wheels, and means associated with said members for indicating such relative deflection.

In testimony whereof I affix my signature this 25th day of August, 1928.

W. T. FRAZIER.

CERTIFICATE OF CORRECTION.

Reissue Patent No. 18,047. Granted April 14, 1931, to

WILLIAM T. FRAZIER.

It is hereby certified that the name of the assignee in the above numbered patent was erroneously written and printed as "A. E. Faragen, Inc.," whereas said name should have been written and printed as A. E. Feragen, Inc., as shown by the records of assignments in this office; and that the said Letters Patent should be read with this correction therein that the same may conform to the record of the case in the Patent Office.

Signed and sealed this 7th day of July, A. D. 1931.

M. J. Moore,
Acting Commissioner of Patents.

(Seal)